United States Patent [19]

Asquith et al.

[11] Patent Number: 5,565,118
[45] Date of Patent: Oct. 15, 1996

[54] SELF STARTING PLASMA PLUME IGNITER FOR AIRCRAFT JET ENGINE

[76] Inventors: Joseph G. Asquith, 24654 Park Granada, Calabasas, Calif. 91302; William P. Peschel, 2421 Glyndon Ave., Venice, Calif. 90291; Jacob L. Sperling, 2640 Marquita Pl., Carlsbad, Calif. 92009

[21] Appl. No.: 258,983

[22] Filed: Jun. 13, 1994

Related U.S. Application Data

[63] Continuation-in-part of Ser. No. 222,012, Apr. 4, 1994, Pat. No. 5,442,907.

[51] Int. Cl.$^6$ .................................................... B23K 10/00
[52] U.S. Cl. ............................... 219/121.57; 219/121.54; 219/121.52; 219/121.48; 315/111.21
[58] Field of Search .......................... 219/121.52, 121.48, 219/121.54, 121.57, 121.5; 60/39.06, 39.091, 39.141, 39.821, 39.826; 315/111.21, 111.81

[56] References Cited

U.S. PATENT DOCUMENTS

| | | | |
|---|---|---|---|
| 2,587,331 | 2/1952 | Jordan | 219/14 |
| 2,942,420 | 6/1960 | Clark | 60/111.21 |
| 4,337,408 | 6/1982 | Sone et al. | 313/130 |
| 4,473,736 | 9/1984 | Bloyet et al. | 219/121 PM |
| 4,609,808 | 9/1986 | Bloyet et al. | 219/121.47 |
| 4,611,108 | 9/1986 | Leprince et al. | 219/121 PR |
| 4,645,973 | 2/1987 | Saliner et al. | 315/39 |
| 4,767,907 | 8/1988 | Otani et al. | 219/121.56 |
| 4,924,061 | 5/1990 | Labat et al. | 219/121.52 |
| 5,086,255 | 2/1992 | Okamoto et al. | 315/111.21 |
| 5,257,500 | 11/1993 | Venkataramani et al. | 60/39.821 |
| 5,414,235 | 5/1995 | Lucas et al. | 219/121.43 |

*Primary Examiner*—Mark H. Paschall
*Attorney, Agent, or Firm*—Saul Epstein

[57] ABSTRACT

A microwave driven self-starting plasma plume igniter for aircraft gas turbine engines. In the preferred embodiment, microwave energy is generated by a magnetron and transmitted through a waveguide and coaxial transmission line. The coaxial transmission line terminates with a corner at the end of the inner conductor being opposed to a corner on the outer conductor, creating a region where the electromagnetic stress will be concentrated, and a self-starting plasma will be created. Air flow through the coaxial transmission line blows the plasma plume out of the end of the coaxial transmission line. In the preferred embodiment, The outer conductor of the coaxial transmission line terminates in a cap with a central hole and the inner conductor terminates even with or slightly behind the inner wall of the outer conductor cap. The corner on the end of the inner conductor is thus opposed to the interior corner on the outer conductor formed by the hole through the cap.

13 Claims, 2 Drawing Sheets

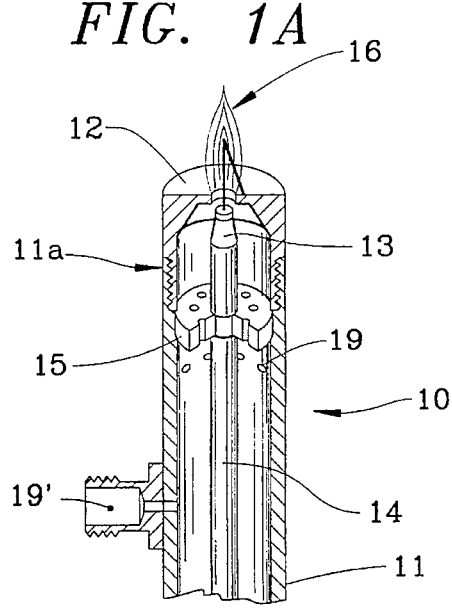
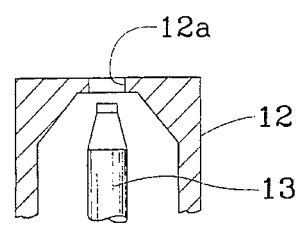
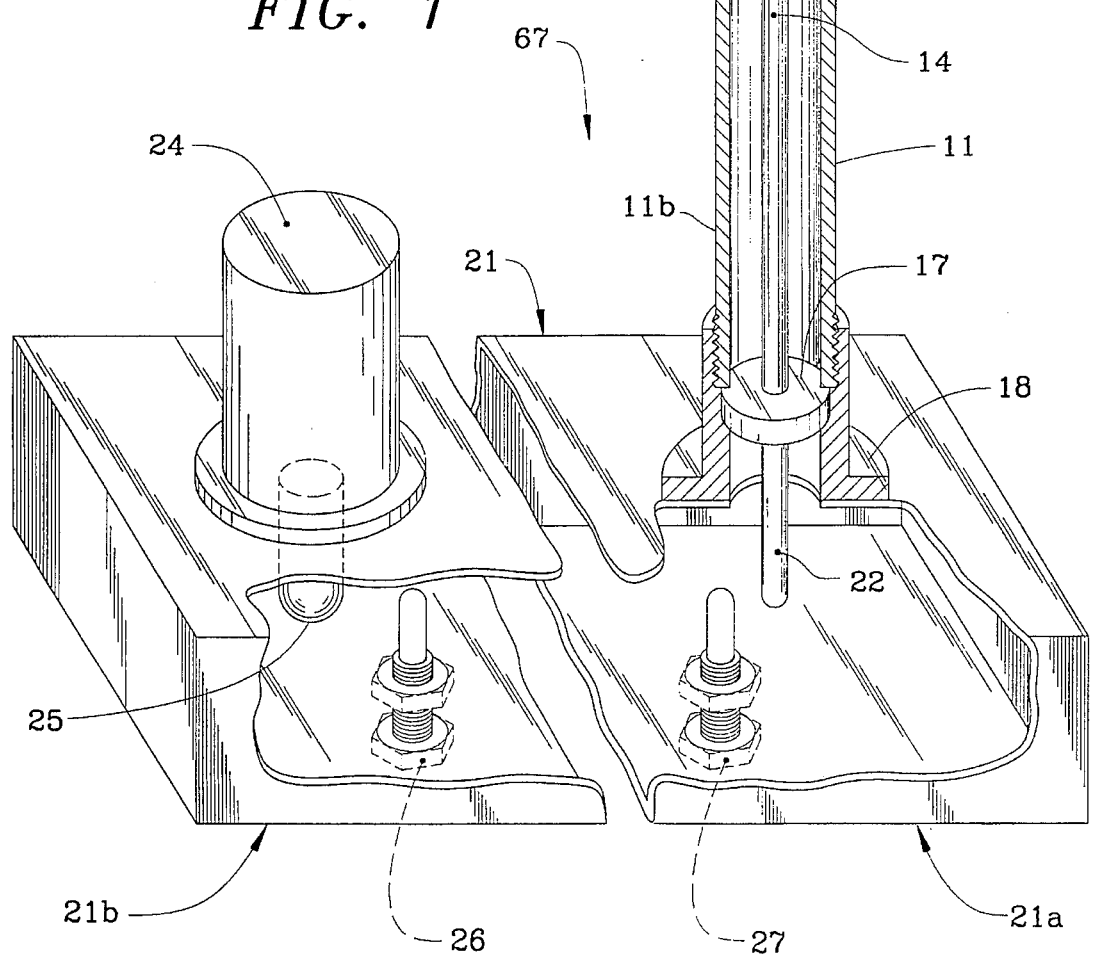

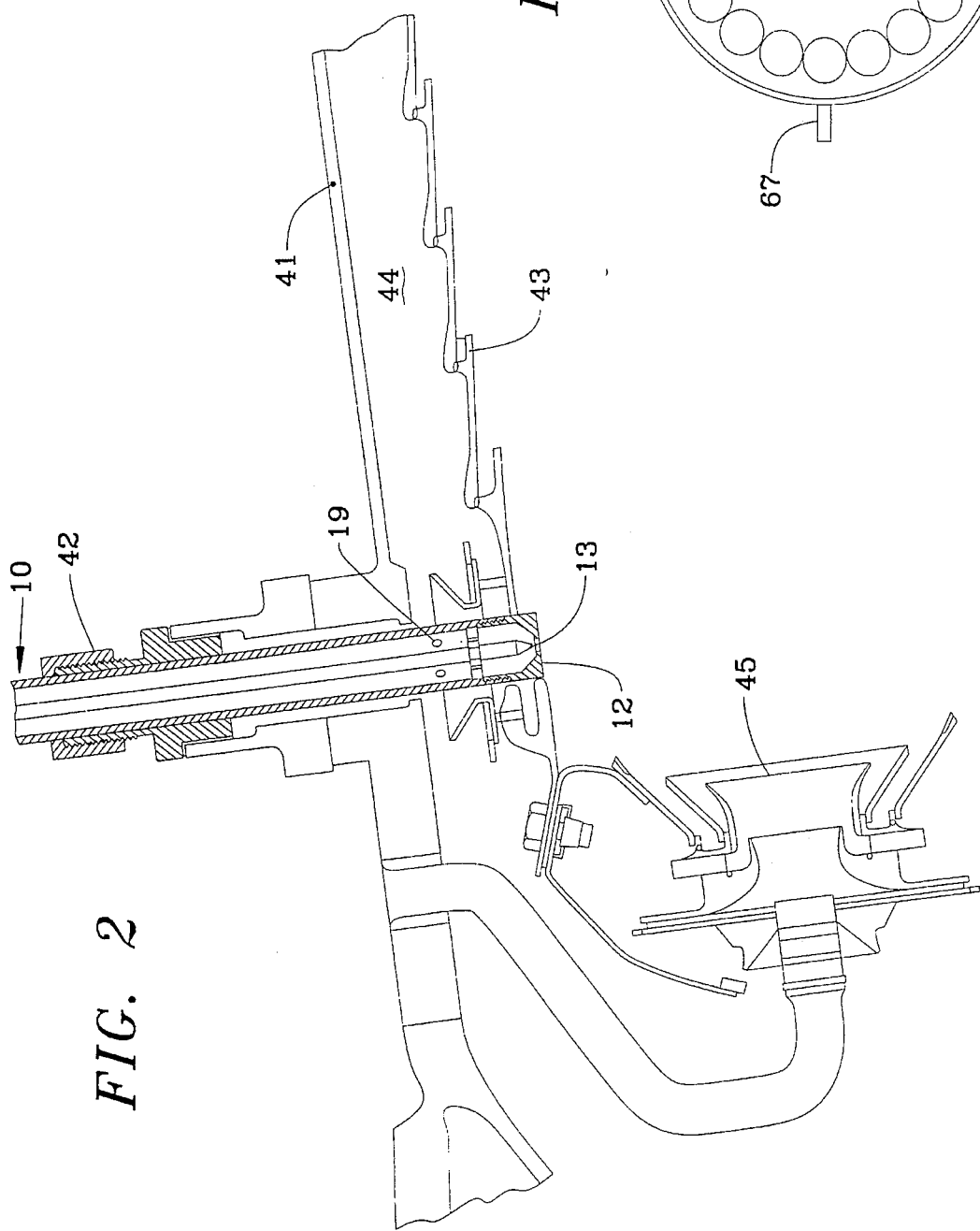

SELF STARTING PLASMA PLUME IGNITER FOR AIRCRAFT JET ENGINE

RELATED APPLICATIONS

This is a continuation-in-part of application Ser. No. 08/222,012, filed Apr. 4, 1994, now U.S. Pat. No. 5,442,907.

BACKGROUND OF THE INVENTION

Aircraft jet engines of current design are generally started using spark discharge igniters. These igniters may employ a high voltage (several tens of kilovolts) which is discharged across a gap formed between a pair of electrodes in a manner similar to ordinary automobile spark plugs, or may employ a low voltage (about 2 to 5 kilovolts) but high energy (10 to 12 Joules) system.

The low voltage type of igniter employs a sealed barrier gap switch to hold-off the discharge until a relatively large energy build-up has occurred. The barrier switch then fires at a predetermined voltage allowing the discharge across the air gap to proceed. The plugs generally consist of inner and outer concentric electrodes spaced by a ceramic high temperature insulator. The insulator is coated with a semiconductor material which facilitates ionization in the discharge gap, thus permitting the spark discharge to initiate at the relatively low two kilovolt voltage. The discharge starts along the surface and builds to a typical ignition spark.

One class of the high voltage type of spark discharge igniters which are in common use are cavity type plasma jet igniters. These are spark plugs that have a small cavity integrated into the region in which the electrodes are located. When fired, the arc discharge ejects or puffs-out a heated volume of gas and a discharge plasma filament.

The cavity type plasma jet spark plug type has a single orifice through which the air that is heated by the arc discharge in the cavity is forced out by thermal expansion, thereby creating a short duration jet. The plasma, which is the ion-electron streak of the spark discharge, is directed out of the cavity region toward the fuel-air mixture and ignites the mixture. Variations of this type of plug in combination with surface discharge spark initiation features have become widely used as combustor igniters in turbojet engines and have seen some application in internal combustion piston engines. But, it must be recognized that these igniters do not and cannot sustain combustion, they only ignite the flowing fuel-air mixture for the duration of each, plasma pulse. As a consequence, other means must be provided to maintain a continuous flame within the engine during operation (generally called "stabilization" of the flame).

A key advantage of cavity type plasma jet spark devices over ordinary spark plugs is that they launch the short-duration, spark-type, plasma filament away from the combustor walls, which could, otherwise cool or quench the ignition kernel. Further, by launching it into the combustor, it more readily reaches a region containing a combustible mixture. A combustible mixture in a turbojet combustor region near the walls can be in a less than optimum condition for ignition due to boundary layer mixing limitations.

On the other hand, cavity type plasma jet spark devices have significant disadvantages in aircraft jet engine applications. In order to deliver the appreciable level of energy necessary to induce ignition, they must operate intermittently. Normally, only about 1 to 2 joules of the 12 to 14 joules developed in a high energy aircraft system reaches the combustion kernel region. This limits state-of-the-art systems to less than 100 to 300 discharges per minute if minimally adequate energy is to be transferred. This is a severe disadvantage during a landing approach or under bad weather flight conditions, when assurance of engine ignition is critical. It is also a severe disadvantage when attempting to relight a flamed out engine at high altitudes.

Also, plug discharge technology is extremely sensitive to excess quantities of fuel (rich mixtures) which can be developed in emergency or inclement weather relight situations. Under these conditions, the discharge can be very substantially reduced and its plasma jet ejection capability almost eliminated.

There have been a number of plasma plume devices built in the past, mostly for use as torches. These devices have not generally been thought suitable for use as engine igniters because they have not been self-starting, requiring some sort of triggering spark to initiate the plasma.

SUMMARY OF THE INVENTION

In the context of an aircraft gas turbine engine (which includes turbojet and turbofan engines) the present invention provides a high energy plasma plume which can extend well into the combustor (or augmentor) section of the engine to ignite the flowing fuel/air mixture existing in the engine. The invented igniter is powered by high frequency electromagnetic waves in the microwave range. The igniter can be operated in a continuous or intermittent mode, as desired, to achieve the desired results. Patent application Ser. No. 08/222012, of which this application is a continuation-in-part, describes the use of an igniter according to the present invention in an intermittent mode to relight a flamed out gas turbine engine at high altitude. On a landing approach or under poor weather conditions, the igniter of the present invention can be used in a continuous mode to assure continuous ignition in the engine.

The invented igniter utilizes a high frequency electromagnetic wave generator, such as a magnetron, generally operating in the microwave region. The generator provides electromagnetic energy which flows through a waveguide and a coaxial transmission line to a region where the energy field is concentrated into a small area at a gap between the transmission line electrodes. Because of the high energy density existing across the gap, the gas (preferably air) in the gap ionizes, creating a plasma. The particular geometry of the gap, comprised of opposing corners on the inner and outer electrodes of the coaxial transmission line, causes a field strength concentration sufficient to make the invented igniter self-starting. Airflow past the gap and out of the end of the coaxial transmission line causes the plasma to fan out into a plume.

BRIEF DESCRIPTION OF THE DRAWINGS

FIG. 1 is a perspective view of an igniter assembly, including the plasma forming section itself, a magnetron power source, and a waveguide coupler for coupling energy from the magnetron to the plasma forming section. The components shown are partly sectioned to show the interiors.

FIG. 1A shows a fragment of a variant of the plasma forming section portion of the assembly of FIG. 1.

FIG. 1B is a fragment of the igniter of FIG. 1 and shows the relationship between the center conductor tip 13 and cap 12 in the preferred construction of the present invention.

FIG. 2 is a sectioned view of a portion of the combustor chamber of a gas turbine jet engine, showing how an igniter may be installed.

FIG. 3 is a diagrammatic rear view of a combustor chamber, showing how several igniters might be spaced in a typical gas turbine jet engine.

DETAILED DESCRIPTION OF THE INVENTION

A presently preferred embodiment of a high frequency electromagnetic wave powered plasma plume igniter, the subject of the present invention, is illustrated in FIG. 1. This figure is a perspective view of an igniter assembly 67, with cut away sections at selected regions of the plasma forming section 10, the waveguide transmission line 21, and the magnetron 24.

Electromagnetic energy which is eventually transformed into thermal energy by the plasma forming section is provided by a magnetron 24 (or other high frequency electromagnetic energy generating device) which is joined to the waveguide 21 at wave launcher section 21b. Energy is radiated from the magnetron by antenna 25, and flows down the waveguide toward the plasma forming section located near the other end of the waveguide at section 21a. The stubs 26 and 27 located in sections 21a and 21b respectively provide adjustment to establish maximum energy coupling over the anticipated operating conditions, as is well known in the art. Once the stub positions are defined they are fixed in position. The total waveguide length is not critical, and can be any length which is convenient for the particular installation.

The plasma forming section 10 is joined to the waveguide by an attachment fitting 18 located near the end of the waveguide opposite the magnetron, at section 21a. The major portion of the length of the plasma forming section is a coaxial transmission line, the outer boundary of which is a tubular metal outer conductor 11. The overall length and shape of the plasma forming section 10 can be substantially varied to permit integration into various jet engine combuster configurations. It should be understood that the length may not be arbitrarily selected, but may be varied by one-half wavelength increments once an operable length has been established. A procedure for establishing an operable length is discussed below.

The outer conductor 11 is preferably manufactured from electrically conductive metals, and it, as well as all of the interior components in close proximity to the engine combuster region interface, must be capable of withstanding temperatures in excess of 600 degrees Celsius. The outer conductor cap 12 (which, in the illustrated embodiment, is threaded into the end of outer conductor 11), and the center conductor tip 13 comprise the plasma plume forming means. The igniter is made self-starting by causing a concentrated energy field to exist between the inner conductor tip 13 and cap 12 before the plasma is created. This is accomplished by locating the top surface of tip 13 even with, or slightly behind the interior corner of hole 12a. The diameter of the extremity of tip 13 is preferably equal to or less than the diameter of hole 12a. There are then a pair of opposed corners between which the field exists before formation of the plasma, causing the field to be concentrated.

For purposes of illustration and example, an operable embodiment of the invention might include a hole 12a about 0.154 inches in diameter and a tip 13 at the end of inner conductor 14 having a diameter of 0.133 inches at its extremity whereby a gap with an annular radius of 0.010 inches is created. An annular radius at the gap of 0.010 to 0.020 appears to be about optimum. Preferably, the end of tip 13 is axially positioned even with the internal edge of hole 12a, or up to a gap of 0.020 inches behind it. An axial spacing of 0.010 inches appears to be about optimum for this configuration, i.e., a ratio of axial gap to annular radius between about 0.5 and 1. Other spacings and/or ratios are also operable. The high field stress which occurs, thereby creating a self-starting plasma, is the result of arranging the inner and outer conductors of the coaxial transmission line such that they are in closest proximity at opposed corners.

The plasma plume 16 is initially formed as a self induced spark between the opposed corners of tip 13 and hole 12a, but after formation (because of air flow through the plasma forming section which will be discussed below) it immediately fans out to form the plume 16.

Tip 13 and cap 12 should be fabricated from metal alloys exhibiting relatively high thermal conductivity, preferably at least four to five times that of austenitic stainless steels, to assist in removing the deposited electron-ion energy and to facilitate cooling by the internal flowing air.

The center conductor 14 of the plasma forming section 10 is centered by a dielectric spacer 15. The dielectric spacer 15 is held against a shoulder on the interior of the outer conductor 11 by the outer conductor cap 12. This attachment maintains the axial position of the dielectric spacer 15. The axial position of the center conductor 14 is held by locking the center conductor to the dielectric spacer 15 between a shoulder in the center conductor 14 and a shoulder developed by threading the center conductor tip electrode 13 into the center conductor 14. The radial spacing between the center conductor 14 and the interior surface of the outer conductor 11 is established by the dielectric spacer 15 along with the dielectric spacer 17 located all the power input end 11b of the plasma forming section 10. The dielectric spacer 17 is designed to allow the inner conductor to slide to accomodate thermal expansion, but the spacer is locked to the outer conducter by a shoulder within the plasma forming section-waveguide attachment fitting 18.

The center conductor 14 can also be held in place by holding it to spacer 17 in the same manner as described for spacer 15, and allowing spacer 15 to slide inside the outer conductor 11 instead of being clamped as shown. Spacer 15, being free to slide, then allows for any differential thermal expansion.

A series of holes 19 in the outer conductor 11 are provided to allow air from outside the combustor liner (which is always at a higher pressure than the interior of the engine combustor) to be injected into the interior of the plasma forming section 10. The pressure outside the combustor liner in most gas turbine engines ranges from about 103 to 115% of the pressure on the inside of the combustor liner. Alternately, a fitting 19' (as seen in FIG. 1A) can be provided so that air (or other suitable gas) can be supplied through a hose or tubing.

The air is confined by the outer conductor 11 and the dielectric spacer 17, but can flow through holes in the dielectric spacer 15 and out into the combustor through the annular orifice formed by the center conductor tip electrode 13 and the hole 12a in the outer conductor cap electrode 12. Air flowing through this annular orifice causes the plasma to form a plume (as shown at numeral 16 of FIG. 1). The air also provides cooling for the plasma forming section components. The velocity of the air, controlled primarily by the applied pressure, the size of holes 19, and the annular orifice, is set based on the environment of the turbojet engine combustor region in which the igniter means is developing the plasma plume. Ordinarily, a few to several tens of cubic feet per hour will be found appropriate.

Magnetron 24, powered by a power supply which is not shown, provides the electromagnetic energy to form the plasma. The magnetron antenna 25 radiates the electromagnetic energy from the magnetron into wave launcher section 21b of the waveguide. The electromagnetic energy is transmitted along the waveguide transmission line toward the plasma forming section antenna 22, where it is received and conducted further along the high frequency coaxial transmission line that couples the energy received at the antenna 22 to the active plasma plume forming end 11a of the plasma forming section. The antenna 22 should be fabricated from a metal with good electrical and thermal conductivity. Preferably, antenna 22 is simply an extension of the inner conductor 14.

As previously noted, the center conductor tip 13 and the outer conductor cap 12, which comprise the plasma plume forming means, develop a locally concentrated field strength when electromagnetic energy is developed in the system. The concentration of field strength causes a plasma discharge to occur between the center conductor tip and a corner on the outer conductor cap. Air flowing through the plasma forming section results in the formation of an external large plasma plume, extended by the magnitude of the forced-air flow, as indicated by numeral 16 in FIG. 1.

As noted above, the length of the plasma forming section 10 is not arbitrary, even though there are many operable lengths available. These operable lengths differ from each other by one-half wavelength at the operating frequency. A basic operating length is determined by experiment, and the actual length of the igniter to be produced is then derived by adding or subtracting a length equal to a multiple of one-half wavelength at the operating frequency so as to obtain an igniter length in the desired range.

It will be appreciated by those skilled in the art that the antenna portion 22 of the inner conductor should basically be one-quarter wavelength long, and that the balance of the inner conductor should basically be a multiple of one-half wavelength. That is, the total length of the inner conductor will be about an odd number of quarter wavelengths long. In practice, the actual physical length of the inner conductor will usually be found to be somewhat shorter than what the preceding sentence would suggest.

Initially it is noted that the speed of propagation of a wave travelling along the coax transmission line at the regions including dielectric spacers 15 and 17 is less than the speed of propagation where the transmission line dielectric is air, therefore the length of the plasma forming section will be slightly shorter than if there were no such spacers. Also, while physically the inner conductor ends at the extremity of tip 13, the effective location of the load is actually somewhere in the plasma beyond the end of the inner conductor. The effective length of the inner conductor, i.e., the distance from the tip of the antenna 22 to the effective location of the load, at an operating frequency of 2.45 GHz, may be as much as 0.25 inches longer than the physical length of the inner conductor itself, i.e., about 0.05 wavelengths at the operating frequency.

On the other hand, before the plasma is created, the transmission line terminates at the end of the inner conductor as an open circuit. In order to be self-starting, the voltage existing at the end of the inner conductor, under open circuit conditions, must be high. Hence, the design of the plasma forming section 10 must be such that the open circuit voltage at the tip 13 is high enough to assure self-starting, as well as to provide substantially optimum power to the plasma under operating conditions. These two requirements may be met with the same physical length of transmission line by introducing a reactance into the system by means of tuning stub 27.

Since it is known that the optimum length of the inner conductor will be somewhat less than an odd number of quarter wavelengths long, it will be found convenient to begin the experimental length determining procedure with an inner conductor about equal to an odd number of quarter wavelengths in length. The outer conductor length is initially set so that about one-quarter wavelength of the inner conductor projects into the waveguide, but not so much that the end of the antenna approaches the far side of the waveguide closely enough to pose a danger of arcing. In many instances, the cross sectional size constraints on the waveguide imposed by the application, and the requirement for proper reactance, will be such that significantly less than one-quarter wavelength of antenna can be allowed to project into the waveguide.

For testing purposes, a directional coupler is incorporated in the waveguide 21 between tuning stubs 26 and 27, and a power meter appropriately connected. Stub 26 is initially adjusted so that maximum power is transmitted from the magnetron down the waveguide. Stub 27 is then adjusted to achieve a self-starting plasma. If no self-starting plasma can be achieved within the stub length adjustment range, the outer conductor length is increased or reduced by some small amount (keeping the inner conductor at the same length, and in the same position relative to cap 12), and another attempt at achieving self-starting is made. After self-starting is achieved, stub 27 is locked in place, and not adjusted further. Reductions in length of the transmission line are then made by shortening only the inner conductor, keeping the spacing between tip 13 and cap 12 constant, until a minimum reflected power is achieved. The transmission line length then achieved is one of the operable lengths of igniter which can form the basis for establishing the length of an igniter to be produced.

This combination of inner and outer conductor lengths can be replicated, or other lengths which differ from the experimentally determined lengths by a multiple of one-half wavelength can be used in production models of the invented igniter.

Under some circumstances, significantly less than one-quarter wavelength of antenna can be allowed to project from the end of the coax transmission line. The main possible reason for this state of affairs is that, because of the cramped quarters around jet engines, the waveguide 21 may not have sufficient depth to allow a full quarter wavelength of antenna to project from the coax transmission line. In such a case, in order to prevent interference with the field lines around the portion of the antenna within the transmission line, it may be found that the inside diameter of the outer conductor in the region of the transmission line which surrounds the antenna must be made significantly larger than the inside diameter of the outer conductor in the portion of the transmission line further into the transmission line. If such is the case, a matching high frequency transformer may be inserted between the input section of the transmission line and the main portion of the transmission line. Such a transformer may be comprised of a one-quarter wavelength section of the transmission line wherein the inside diameter of the outer conductor is such that the impedance of this section equals the square root of the product of the impedances of the entry section and the main section of the transmission line.

A typical igniter installation in the combustor section of a jet engine is shown in FIG. 2. As shown, the plasma forming section 10 passes through an opening in the wall of the engine casing 41, and is held in place by a compression type of fitting 42, with the face of cap 12 being approximately flush with the interior of the combustor liner 43. Holes 19 are seen to be in a position to receive air from the region 44 between the engine casing and the combustor lining. Air in this region is at a higher pressure than that in the combustor interior so that, in operation, there is always a flow of air to extend the plasma plume into the combustor. The plasma plume provides thermal energy to ignite fuel which is being supplied to the combustor from the fuel cup 45.

The plasma plume can be continuous, if desired, or, because the igniter is self-starting, the plume can be conveniently operated in an intermittent mode.

Two or more igniters may be spaced around the circumference of the engine depending on the design of the particular engine involved. These igniters form the source of thermal energy which can be used to start the engine under normal conditions, or to controllably reestablish normal operating conditions within the combustor of an engine which has suffered a flameout. As depicted in FIG. 3, four igniters 67 are shown installed in an engine with twenty fuel cups 45.

Another aspect of the present invention is the use of the invented igniter in a gas turbine engine in such a way as to increase the efficiency of the engine. In a gas turbine engine, means must be provided to maintain (stabilize) combustion while the engine is running. It is conventional to cause the air entering the engine (e.g., through fuel cups 45) to swirl (e.g., by means of vanes within the fuel cups (not shown)). A low pressure region is developed by the swirl downstream of each fuel cup. This region includes a zone of recirculating fuel/air mixture which is burning, thereby maintaining a flame in the engine. The necessity of maintaining a recirculating mixture in the engine requires the use of relatively long inlet diffusers, and imposes air inlet velocity constraints on the combustor. This causes the recircularization stabilization to be less dependable, possibly causing flameout at low engine power levels, low compressor pressure, and low air mass flow, typical of aircraft approach, landing, and during bad weather descent conditions. There is also a significant energy loss associated with the swirling fuel/air mixture, which is obviously undesirable.

The present invention can be used to stabilize the flame in a combustor by developing continuous combustion at the plasma plume, and thereby assure that a stabilization region exists under all flight conditions, including those hazardous conditions mentioned above, without the necessity of providing gas recirculation with its attendant losses. In such use, the igniters should preferably, but not necessarily, be inserted into the combustor sufficiently that the plasma plume is well immersed into the combustible mixture emanating from the respective fuel cups, or other means used to introduce fuel, to optimize the resulting combustion. It is also preferable that the igniter shank (the coaxial transmission line) be encased in an aerodynamically efficient sheath so as to keep drag to a minimum. The igniters in such an application would, of course, be operated in a continuous mode. The use of the present invention in this application permits the use of a substantially shorter diffuser, thus reducing the engine length and weight, and improving its reliability and integration complexity.

It is anticipated that those skilled in the art will be able to modify and adapt the concepts disclosed herein so as to create other embodiments of the invention. Such embodiments as are within the spirit of the following claims are intended to be covered thereby.

We claim:

1. A self starting high frequency electromagnetic wave powered plasma plume igniter which comprises:

a coaxial transmission line comprised of an outer contractor and an inner conductor each having an output end and an input end, said outer conductor terminating at said output end in a cap, said car having an axial through hole substantially coaxial with said inner conductor, the junction of said hole with the interior of said coaxial transmission line defining an interior corner of said hole, the tip of said inner conductor at its output end having a circumferential corner thereon, the diameter of said inner conductor at said tip being equal to or smaller than said hole, and positioned axially with respect to said interior corner of said hole such that the distance between said interior corner of said hole and said circumferential corner on said tip of said inner conductor is less than the distance between said inner conductor and said cap at any other point;

means for introducing gas at a higher than ambient pressure into the interior of said coaxial transmission line; and means for coupling high frequency electromagnetic energy to said inner conductor at said input end.

2. A self starting high frequency electromagnetic wave powered plasma plume igniter as recited in claim 1 where the axial distance between said interior corner of said hole and said tip of said inner conductor is between zero and about 0.020 inches and the annular radius between said tip of said inner conductor and said hole is between about 0.010 inches and about 0.020 inches.

3. A self starting high frequency electromagnetic wave powered plasma plume igniter as recited in claim 1 where the ratio of the axial distance between said interior corner of said hole and said tip of said inner conductor to the annular radius between said tip of said inner conductor and said hole is between about 0.5 and about 1.

4. A self starting high frequency electromagnetic wave powered plasma plume igniter as recited in claim 1 where said gas is air.

5. A self starting high frequency electromagnetic wave powered plasma plume igniter as recited in claim 4 where the axial distance between said interior corner of said hole and said tip of said inner conductor is between zero and about 0.020 inches, and the annular radius between said tip of said inner conductor and said hole is between about 0.010 inches and about 0.020 inches.

6. A self starting high frequency electromagnetic wave powered plasma plume igniter as recited in claim 4 where the ratio of the axial distance between said interior corner of said hole and said tip of said inner conductor to the annular radius between said tip of said inner conductor and said hole is between about 0.5 and about 1.

7. A self starting high frequency electromagnetic wave powered plasma plume igniter as recited in claim 1 and further including a high frequency electromagnetic wave generator for generating said high frequency electromagnetic energy, and a waveguide for coupling said high frequency electromagnetic energy to said inner conductor.

8. A self starting high frequency electromagnetic wave powered plasma plume igniter as recited in claim 7 where said high frequency electromagnetic wave generator is a magnetron.

9. A self starting high frequency electromagnetic wave powered plasma plume igniter which comprises:

a coaxial transmission line comprised of an outer conductor and an inner conductor each having an output end and an input end, said outer conductor terminating at its output end in a cap having an axial opening with a corner thereon, said inner conductor having a corner at its output end, said inner conductor and said outer conductor being at their closest at said corners;

means for introducing gas at a higher than ambient pressure into the interior of said coaxial transmission line; and means for coupling high frequency electromagnetic energy to said inner conductor at said input end.

10. A self starting high frequency electromagnetic wave powered plasma plume igniter as recited in claim 9 where the distance between said corners is between about 0.010 inches and about 0.028 inches.

11. A self starting high frequency electromagnetic wave powered plasma plume igniter as recited in claim 9 where said gas introduced has a pressure in the range of about 103 to 115% of the pressure existing at the output end of said coaxial transmission line.

12. A self starting method for determining the length of the coaxial transmission line portion of a high frequency electromagnetic wave powered plasma plume igniter of the type which comprises a waveguide for coupling electromagnetic energy to a coaxial transmission line, a coaxial transmission line having an outer conductor and an inner conductor and an antenna protruding from one end to receive said electromagnetic energy from said waveguide, and a gap at the other end of said coaxial transmission line for forming a plasma, which comprises the steps of:

coupling electromagnetic energy having a predetermined frequency into said waveguide;

adjusting a tuning stub located within said waveguide and incrementally altering the length of said outer conductor until a self-starting plasma is obtained; and incrementally altering the length of said inner conductor until a minimum amount of power is reflected back into said waveguide from said coaxial transmission line.

13. The method for determining the length of the coaxial transmission line portion of a high frequency electromagnetic wave powered plasma plume igniter as recited in claim 12, and further including the step of fabricating a second igniter having a coaxial transmission line whose length varies from the length determined in the prior steps by an integral multiple of one-half wavelengths at said predetermined frequency, said integral multiple being zero, one, or more.

* * * * *